US007496035B1

(12) United States Patent  
Sadasivan et al.

(10) Patent No.: US 7,496,035 B1  
(45) Date of Patent: Feb. 24, 2009

(54) METHODS AND APPARATUS FOR DEFINING FLOW TYPES AND INSTANCES THEREOF SUCH AS FOR IDENTIFYING PACKETS CORRESPONDING TO INSTANCES OF THE FLOW TYPES

(75) Inventors: Ganesh Sadasivan, Sunnyvale, CA (US); Rengabashyam Srinivas, Sunnyvale, CA (US); William N. Eatherton, San Jose, CA (US); Xiaoxue Ma, Sunnyvale, CA (US); Peram Marimuthu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 851 days.

(21) Appl. No.: 10/355,831

(22) Filed: Jan. 31, 2003

(51) Int. Cl.
G08C 15/00 (2006.01)
(52) U.S. Cl. ...................... 370/235; 707/102
(58) Field of Classification Search ............ 370/230, 370/230.1, 231, 232, 233, 234, 235; 707/6, 707/102; 709/238
See application file for complete search history.

(56) References Cited

U.S. PATENT DOCUMENTS

| 5,088,032 | A |   | 2/1992  | Bosack          |
|-----------|---|---|---------|-----------------|
| 5,319,763 | A |   | 6/1994  | Ho et al.       |
| 5,481,540 | A |   | 1/1996  | Huang           |
| 5,515,370 | A |   | 5/1996  | Rau             |
| 5,740,171 | A |   | 4/1998  | Mazzola et al.  |
| 5,842,040 | A |   | 11/1998 | Hughes et al.   |
| 5,867,480 | A | * | 2/1999  | Thomas et al. ............ 370/230 |
| 5,898,689 | A |   | 4/1999  | Kumar et al.    |
| 5,920,886 | A |   | 7/1999  | Feldmeier       |
| 5,930,359 | A |   | 7/1999  | Kempke et al.   |
| 6,000,008 | A |   | 12/1999 | Simcoe          |
| 6,061,368 | A |   | 5/2000  | Hitzelberger    |
| 6,091,725 | A |   | 7/2000  | Cheriton et al. |
| 6,097,724 | A |   | 8/2000  | Kartalopoulos   |
| 6,141,738 | A |   | 10/2000 | Munter et al.   |
| 6,148,364 | A |   | 11/2000 | Srinivasan et al. |

(Continued)

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

(Continued)

*Primary Examiner*—Chi H. Pham
*Assistant Examiner*—Kevin Mew
(74) *Attorney, Agent, or Firm*—The Law Office of Kirk D. Williams (57) ABSTRACT

Methods and apparatus are disclosed for defining flow types and instances thereof such as for identifying packets corresponding to instances of the flow types. A flow type is defined and includes a set of properties including at least one of the possible properties selectable when defining a flow type. An instance of the flow type is defined and a set of corresponding associative memory entries is generated. A lookup word generator of a packet processing engine is typically notified of the use of the flow type, and one or more lookup words are generated typically by extracting fields from a received packet and/or from other sources. Based on a result of lookup operations on the set of associative memories entries using the generated one or more lookup words, the received packet can be identified as whether it matches or does not match the instance of the flow type.

31 Claims, 5 Drawing Sheets

U.S. PATENT DOCUMENTS

| | | | |
|---|---|---|---|
| 6,219,748 B1 | 4/2001 | Srinivasan et al. | |
| 6,236,658 B1 | 5/2001 | Essbaum et al. | |
| 6,237,061 B1 | 5/2001 | Srinivasan et al. | |
| 6,240,485 B1 | 5/2001 | Srinivasan et al. | |
| 6,243,667 B1 | 6/2001 | Kerr et al. | |
| 6,285,378 B1 | 9/2001 | Duluk, Jr. | |
| 6,289,414 B1 | 9/2001 | Feldmeier et al. | |
| 6,295,576 B1 | 9/2001 | Ogura et al. | |
| 6,308,219 B1 | 10/2001 | Hughes | |
| 6,374,326 B1 | 4/2002 | Kansal et al. | |
| 6,377,577 B1 | 4/2002 | Bechtolsheim et al. | |
| 6,389,506 B1 | 5/2002 | Ross et al. | |
| 6,396,807 B1 * | 5/2002 | Peligry et al. | 370/230 |
| 6,430,190 B1 | 8/2002 | Essbaum et al. | |
| 6,434,662 B1 | 8/2002 | Greene et al. | |
| 6,466,984 B1 * | 10/2002 | Naveh et al. | 709/228 |
| 6,526,474 B1 | 2/2003 | Ross | |
| 6,535,951 B1 | 3/2003 | Ross | |
| 6,591,299 B2 * | 7/2003 | Riddle et al. | 709/224 |
| 6,606,301 B1 * | 8/2003 | Muller et al. | 370/230 |
| 6,636,482 B2 * | 10/2003 | Cloonan et al. | 370/230 |
| 6,718,326 B2 * | 4/2004 | Uga et al. | 707/6 |
| 6,845,352 B1 * | 1/2005 | Wang | 703/24 |
| 7,028,098 B2 * | 4/2006 | Mate et al. | 709/238 |
| 7,061,861 B1 * | 6/2006 | Mekkittikul et al. | 370/230 |
| 7,092,357 B1 * | 8/2006 | Ye | 370/230 |
| 7,093,092 B2 * | 8/2006 | Stojancic | 711/164 |
| 7,230,921 B2 * | 6/2007 | Eriksson et al. | 370/230 |
| 7,298,724 B2 * | 11/2007 | Lin et al. | 370/338 |
| 7,453,804 B1 * | 11/2008 | Feroz et al. | 370/230 |
| 2002/0023080 A1 * | 2/2002 | Uga et al. | 707/1 |
| 2003/0056001 A1 * | 3/2003 | Mate et al. | 709/238 |
| 2005/0220014 A1 * | 10/2005 | DelRegno et al. | 370/230 |
| 2005/0220022 A1 * | 10/2005 | DelRegno et al. | 370/235 |
| 2006/0039372 A1 * | 2/2006 | Sarkinen et al. | 370/389 |

OTHER PUBLICATIONS

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"What is a CAM (Content-Addressable Memory)?," Application Brief AB-N6, Rev. 2a, Music Semiconductors, Milpitas, CA, Sep. 30, 1998, 4 pages.

"Reading Out the Valid LANCAM Memory Entries," Application Brief AB-N4, Rev. 1a, Music Semiconductors, Milpitas, CA, Sep. 30, 1998, 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using Music Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

Donald R. Morrison, "PATRICIA—Practical Algorithm to Retrieve Information Coded in Alphanumeric," Journal of the ACM, vol. 15, No. 4, Oct. 1968, pp. 514-534.

Waldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pages.

V. Srinivasan and George Varghese, "Faster IP Lookups using Controlled Prefix Expansion," ACM SIGMETRICS Performance Evaluation Review, vol. 26 No. 1, Jun. 1998, pp. 1-10.

Stefan Nilsson and Gunnar Karlsson, "Fast Address Look-up for Internet Routers," Proceedings of IEEE Broadband Communications, Apr. 1998, 12 pages.

William N. Eatherton, Hardware-Based Internet Protocol Prefix Lookups, Master's thesis, Sever Institute, Washington University, St. Louis, MO, May 1999, 109 pages.

Lampson et al., "IP Lookups Using Multiway and Multicolumn Search," IEEE Transactions on Networking, vol. 7, No. 3, Jun. 1999, pp. 324-334.

Lockwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick McKewon, "Algorithms for Packet Classification," IEEE Network Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Devavrat Shah and Pankaj Gupta, "Fast Incremental Updates on Ternary-CAMs for Routing Lookups and Packet Classification," Proc. Hot Interconnects VIII, Aug. 2000, Stanford. IEEE Micro, vol. 21, No. 1, Jan./Feb. 2001, 9 pages.

Waldvogel et al., "Scalable Best Matching Prefix Lookups," PODC 98, ACM 1998.

Radia Perlman, Interconections: Bridges, Routers, Switches, and Internetworking Protocols, Second Edition, Addison-Wesley, 2000, pp. 347-365.

Pankaj Gupta and Nick McKeown, "Algorithms for Packet Classification," IEEE Network Special Issue, Mar./Apr. 2001, vol. 15, No. 2, pp. 24-32 (reprint 29 pages).

Srinivasan et al., "Packet Classification Using Tuple Space Search," ACM Computer Communication Review, 1999. ACM SIGCOMM'99, Sep. 1999 (12 pages).

Srinivasan et al., "Fast and Scalable Layer Four Switching," ACM Computer Communication Review, 28(4):191-202, 1998. ACM SIGCOMM'98, Sep. 1998 (12 pages).

Stefan Nilsson and Gunnar Karlsson, "IP-Address Lookup Using LC-Tries," IEEE Journal on Selected Areas in Communications, Jun. 1999 (12 pages).

* cited by examiner

METHODS AND APPARATUS FOR DEFINING FLOW TYPES AND INSTANCES THEREOF SUCH AS FOR IDENTIFYING PACKETS CORRESPONDING TO INSTANCES OF THE FLOW TYPES

FIELD OF THE INVENTION

This invention especially relates to communications and computer systems; and more particularly, the invention relates to methods and apparatus for defining flow types and instances thereof such as for identifying packets corresponding to instances of the flow types, which may be used in, but are not limited to being used in packet switching, networking, and user equipment.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A flow is a set of packets passing through a network during a certain time interval that possess some common properties. Identification of which packets belonging which flows is necessary in a data network. Nodes within the data network can then select packets based on this identification and perform operations that are defined by the user. For example, all packets originating from Autonomous System (AS) 10 and destined to AS 20 can constitute a flow. Billing based on network traffic between AS 10 and 20 can be done by counting all the packets and bytes that belong to this flow.

Today, there is no one consistent way to define flows that work across applications, such as, but not limited to quality of service, billing, access control, routing, statistics, network management, or any other process or operation performed which requires information pertaining to one or more flows. One known way of identifying flows and corresponding packets is to define a super-flow comprising of all the possible property fields on which a match is possible. The fields of interest get filled in with values to be matched and the rest are wild-carded (i.e., set to a don't care conditions so these fields match every value/packet). However, this scheme uses a lot of valuable resources (e.g., associative memory entries), and very often not all of these fields are required for identifying packets belonging to a flow for a given application.

For example, the super-flow for IPV4 is defined as the tuple {source IP, destination IP, source port, destination port, L3 protocol, TOS, TCP flags}. An application like customer prefix based billing, requires only {destination IP Prefix, mask length, TOS}. Using IPV4 super-flow for this application leads to an overly complicated configuration task for the user. Applications come up with requirements to add new fields to define more detailed flows. This affects all applications whether they intend to use these new fields or not. This may result in incompatibility with previous super-flow configurations.

Another known way of identifying flows and corresponding packets is to provide a fixed set of predefined types of flows, such that applications can select among these flow types. Such predefined types are not flexible nor customizable, and may not meet the requirements of an application or customer. Moreover, as the demands of existing and new customers change, so does the desired flow types, and to add new predefined flow types requires significant development costs and deployment delays.

Needed are new methods and apparatus for defining flows and identifying packets corresponding to the defined flows.

SUMMARY OF THE INVENTION

Methods and apparatus are disclosed for defining flow types and instances thereof such as for identifying packets corresponding to instances of the flow types, which may be used in, but are not limited to being used in packet switching, networking, and user equipment. One embodiment defines a flow type, which includes a set of properties, the set of properties including at least one property of the possible properties selectable when defining a flow type. An instance of the flow type is defined. A set of associative memory entries corresponding to the instance of the flow type is generated, and one or more associative memories are programmed with said associative memory entries. A lookup word generator of a packet processing engine is typically notified of the use of the flow type, and one or more lookup words are generated typically by extracting fields from a received packet and/or from other sources. Based on the results of lookup operations on the set of associative memories entries using the generated lookup words, received packets can be identified as whether they match or do not match the instance of the flow type.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for defining flow types and instances thereof such as for identifying packets corresponding to instances of the flow types, which may be used in, but are not limited to being used in packet switching, networking, and user equipment. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet contents (e.g., packet header or other fields), and such steps or action may or may not include modifying and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content-addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Methods and apparatus are disclosed for defining flow types and instances thereof such as for identifying packets corresponding to instances of the flow types, which may be used in, but are not limited to being used in packet switching, networking, and user equipment. One embodiment defines a first flow type including a first set of properties, the first set of properties including at least one of the possible properties selectable when defining a flow type. A first instance of the first flow type is defined. First associative memory entries corresponding to the first instance of the first flow type are generated, and the associative memories are programmed with the first associative memory entries.

In one embodiment, a lookup word generator of a packet processing engine is notified of the use of the first flow type, and one or more lookup words are generated typically by extracting fields from a received packet and/or from other sources. Based on a result of lookup operations on the first set of associative memories entries using the generated one or more lookup words, the received packet can be identified as whether it matches or does not match the first instance of the flow type.

In one embodiment, defining the first instance includes identifying attributes for each of the properties of the first set of properties. In one embodiment, defining the first flow type includes receiving configuration information, and updating a data structure based on said received configuration information. One embodiment further includes defining a second instance of the first flow type, generating second associative memory entries corresponding to the second instance, and programming said one or more associative memories with said second associative memory entries. In one embodiment, the first instance is associated with a first application and the second instance is associated with a second application. In one embodiment, the first instance is associated with both a first application and a second application. In one embodiment, said defining the first instance includes identifying a data structure specification of the first flow type. In one embodiment, the first set of properties consists of less than all of the possible properties.

One embodiment also defines a second flow type including a second set of properties, the second set of properties including at least one of the possible properties selectable when defining a flow type. A second instance of the second flow type is defined. Second associative memory entries corresponding to the second instance of the second flow type are generated, and the associative memories are programmed with the second associative memory entries. The lookup word generator is also notified of the second flow type, and corresponding lookup words are generated to determine whether packets match the second instance.

Figure 1:
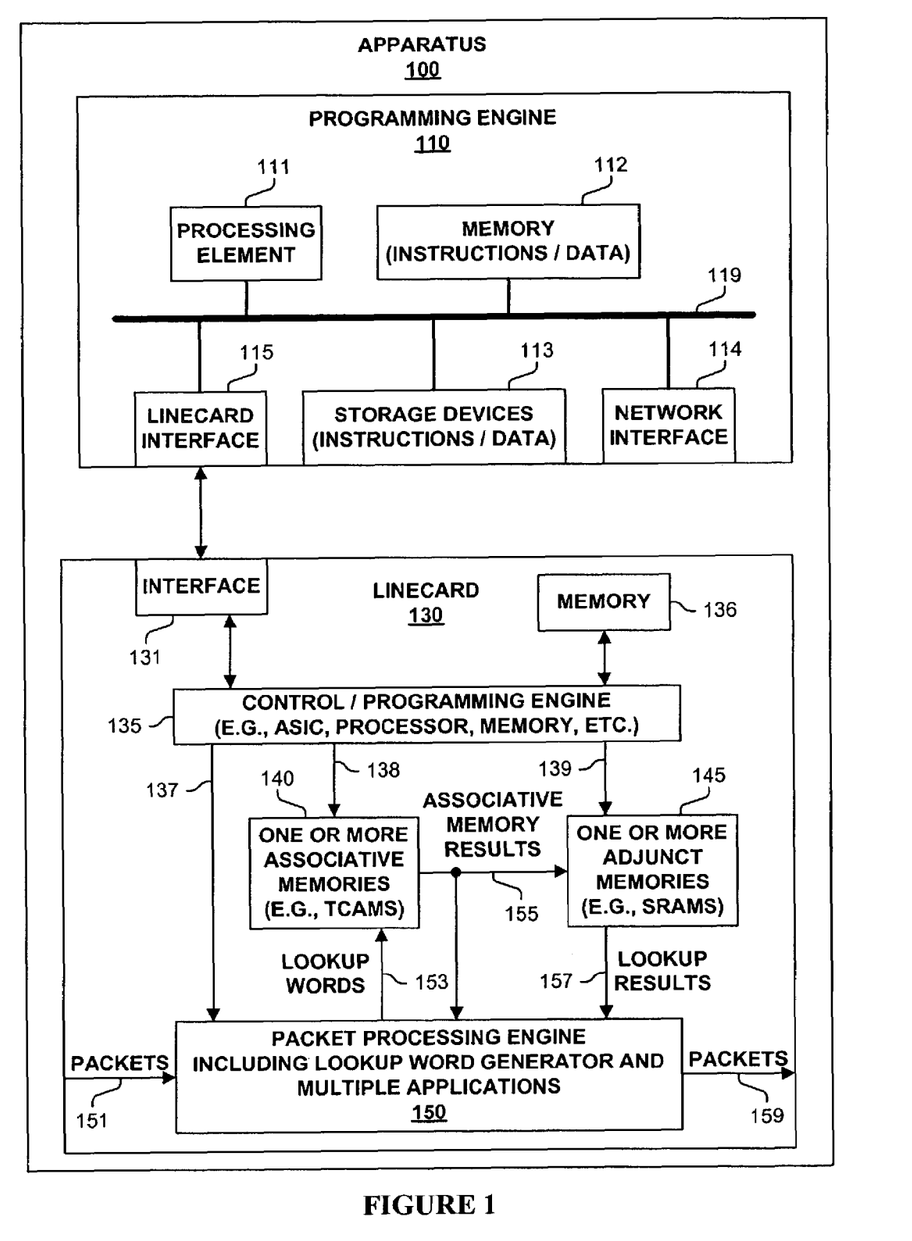
FIG. 1 is a block diagram of an apparatus including one embodiment for defining flow types and instances thereof and for identifying packets corresponding to instances of the flow types.

FIG. 1 is a block diagram of an apparatus 100 including one embodiment for defining flow types and instances thereof and for identifying packets corresponding to instances of the flow types. As shown, apparatus 100 includes a programming engine 110 and a linecard 130. Of course more and/or different cards are used in one embodiment. Also, in one embodiment, the mechanisms for defining flow types and instances thereof and for identifying packets corresponding to instances of the flow types are located in a single system.

In one embodiment, programming engine 110 receives information, via network interface 114, which indicates flow types and instances to be defined by apparatus 100, such as by programming engine 110 or by linecard 130 (e.g., by control/programming engine 135). This information may by generated by a user, application, or any other mechanism, and may take many forms, such as, but not limited to that corresponding to a command line interface, definition files, encoded messages, machine code, or any other computer-executable instructions or data. In one embodiment, programming engine 110 defines the flow types and their instances and communicates these to linecard 130. In one embodiment, programming engine 110 communicates the received information to linecard 130 (e.g., by control/programming engine 135 or another component), which defines the flow types and their instances.

In one embodiment, programming engine 110 includes a processing element 111, memory 112, storage devices 113, network interface 114 for communicating with other systems, and linecard interface 115, which are typically coupled via one or more communications mechanisms 119 (shown as a bus for illustrative purposes). Various embodiments of communications mechanism including a programming engine 110 may include more or less elements. The operation of programming engine 110 is typically controlled by processing element 111 using memory 112 and storage devices 113 to perform one or more tasks or processes. Memory 112 is one type of computer-readable medium, and typically comprises random access memory (RAM), read only memory (ROM), flash memory, integrated circuits, and/or other memory components. Memory 112 typically stores computer-executable instructions to be executed by processing element 111 and/or data which is manipulated by processing element 111 for implementing functionality in accordance with the invention. Storage devices 113 are another type of computer-readable medium, and typically comprise solid state storage media, disk drives, diskettes, networked services, tape drives, and other storage devices. Storage devices 113 typically store computer-executable instructions to be executed by processing element 111 and/or data which is manipulated by processing element 111 for implementing functionality in accordance with the invention.

Referring to linecard 130, control/programming engine 135 receives information via interface 131, and typically stores this information, or a representation thereof, in memory 136. In one embodiment, control/programming engine 135 includes an ASIC, processing element, memory, and/or other elements. In one embodiment, control/programming engine 135 defines the flow types and instances thereof, and generates the corresponding associative memory entries and adjunct memory entries. Control/programming engine 135 typically programs one or more associative memories 140 via line 138 and one or more optional adjunct memories 145 via line 139 with these generated entries. In one embodiment, control/programming engine 135 also notifies packet processing engine including a lookup word generator and multiple applications 150 of the one or more defined flow types such that it will generated the appropriate lookup words.

During packet operations, packets 151 are received by packet processing engine 150, which generates one or more lookup words 153 corresponding to the defined flow types of one or more applications (e.g., Quality of Service, billing, access control, routing, etc.) which are communicated over line 137 from control/programming engine 135. One or more associative memories 140 perform lookup operations based on its entries corresponding to the defined instances of the flow types to generate one or more associative memory results 155. In one embodiment, packet processing engine 150 processes packets based on associative memory results 155. In one embodiment, one or more adjunct memories 145 perform lookup operations based on associative memory results 155 to generate lookup results 157, which may be used by packet processing engine 150 in determining how to route the packet. Packets 151 processed by packet processing engine 150 may be forwarded to other systems as indicated by packet 159.

Figure 2:
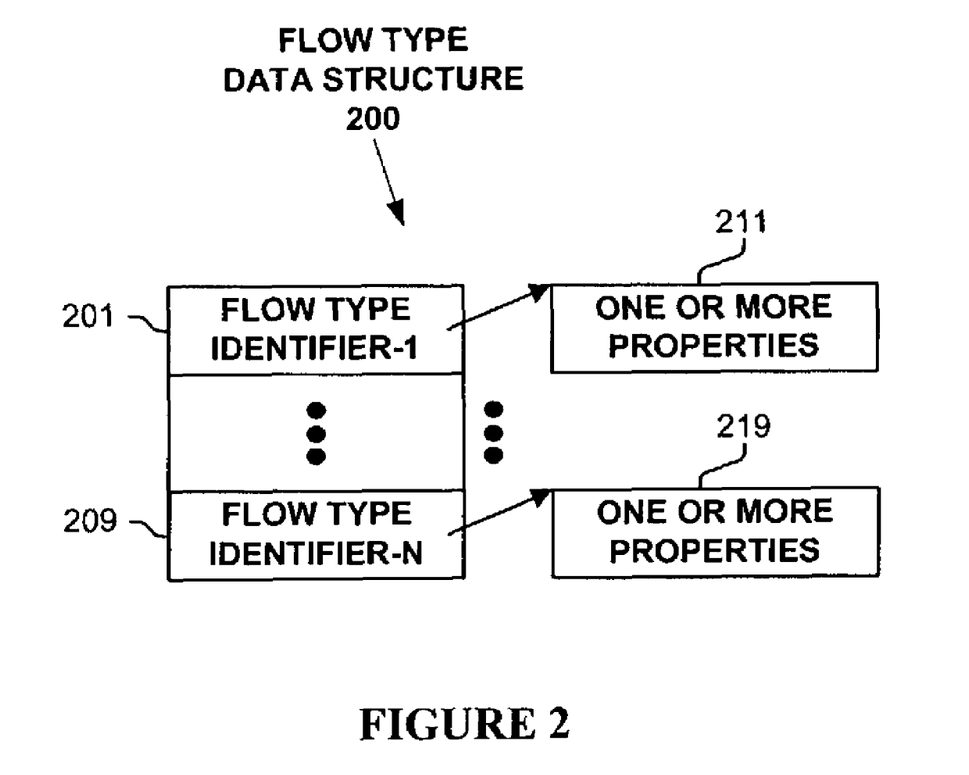
FIG. 2 is a block diagram of a flow type data structure used in one embodiment.

FIG. 2 is a block diagram of a flow type data structure 200 used in one embodiment. In one embodiment, flow type data structure 200 is stored in memory 112, memory 136, control/programming engine 135, and/or packet processing engine 150 shown in FIG. 1. As shown in FIG. 2, flow type data structure 200 includes a plurality of entries 201-209 identifying an identifier of a defined (or to be defined) flow type, with a linked list of one or more properties associated with the corresponding entry 201-209. For example, flow type identifier-1 (201) is associated with one or more properties 211, and flow type identifier-N (209) is associated with one or more properties 219. Of course, any data structure could be used in place of, or in addition to flow type data structure 200.

Examples of properties which may be used in one embodiment include, but are not limited to: IPv4-source-address, IPv4-destination-address, IPv6-source-address, IPv6-destination-address, source-AS, destination-AS, source-L4-port, destination-L4-port, TOS, precedence, transport-protocol, output-interface-index, input-interface-index, IPv4-source-mask, IPv4-destination-mask, IPv6-source-mask, IPv6-destination-mask, IP header flags (fragmentation bits), TCP-flags, discard-reason, Flow label (IPV6), and MPLS top labels. Of course, the possible properties used in defining a flow type depend on the embodiment and applications to be supported.

Figure 3:
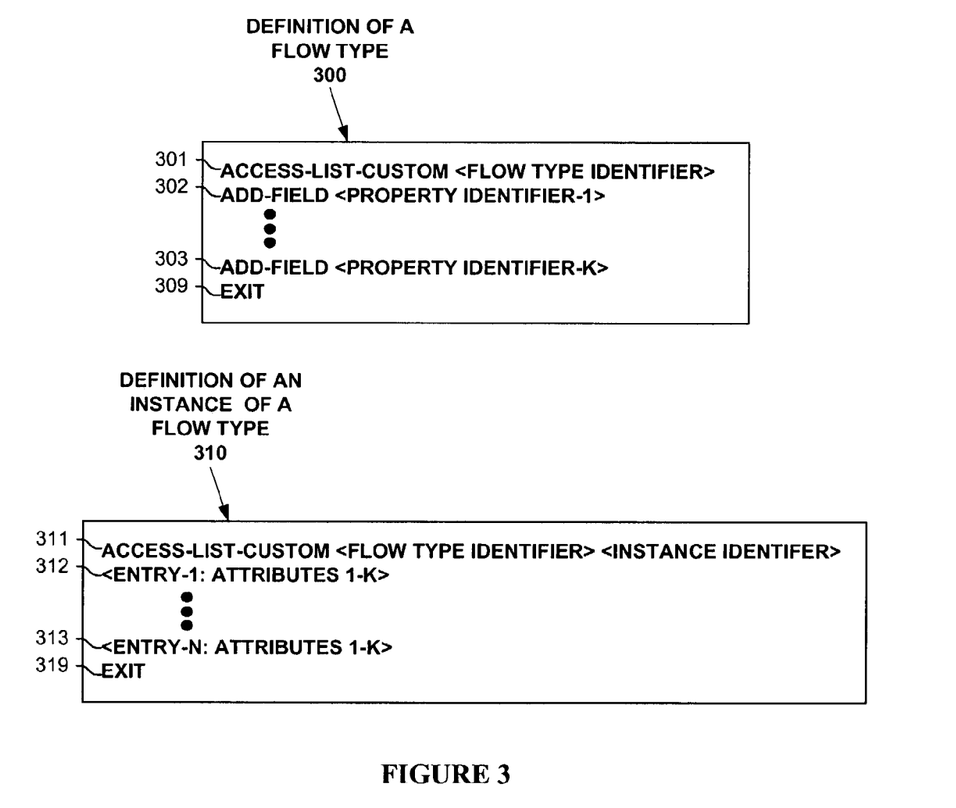
FIG. 3 illustrates command lines used in one embodiment to define a flow type and instance of a flow type.

FIG. 3 illustrates command lines used in one embodiment to define a flow type and instance of a flow type. Shown in command screen 300 are the command lines 301-309 input via a command line interface used to describe a flow type in one embodiment. First, command line 301 specifies to create a flow type identified by <flow type identifier>. Next, command lines 302-303 specify the properties associated with this flow type. The specification of the flow type is completed as indicated by command line 309. During or after this operation, a data structure, such as flow type data structure 200 (FIG. 2) is updated to reflect the definition of the flow type.

Next, shown in command screen 310 are the command lines 311-319 input via a command line interface used to describe a flow type instance in one embodiment. First, command line 311 specifies to create an instance of flow type identified by <flow type identifier> and identifying this instance by <instance identifier>. Next, command lines 312-313 specify the desired matching values or attributes corresponding to the defined properties associated with this flow type. For example, an IPv4 source address value might be defined as 10.0.0.* to match against devices on a local LAN. The specification of the instance of the flow type is completed as indicated by command line 319. By specifying these flow types and instances thereof in this manner, multiple applications can simultaneously use these flow types and instances thereof, which can save valuable configuration time and resources.

Figure 4:
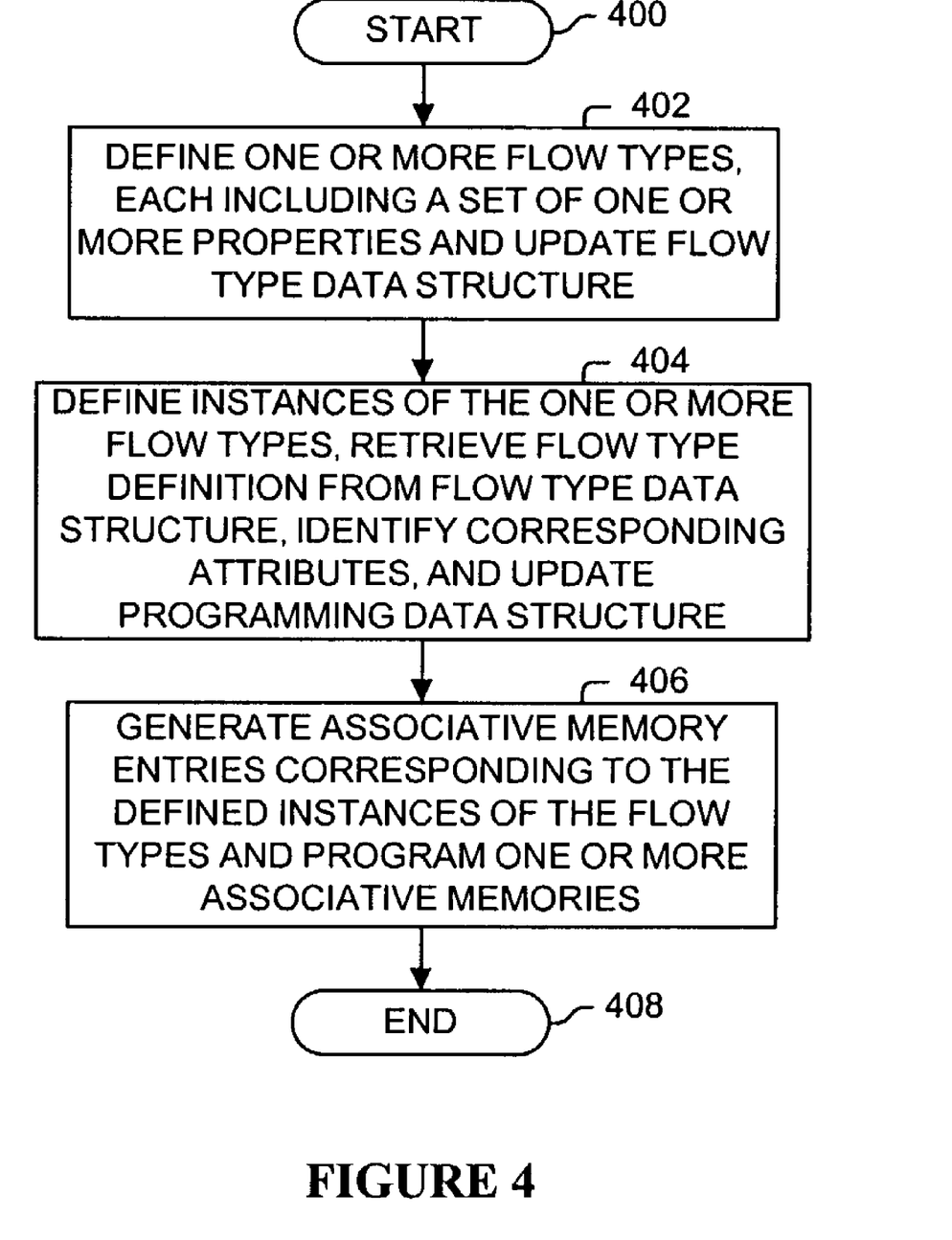
FIG. 4 is a flow diagram of a process used in one embodiment to define flow types and instances thereof.

FIG. 4 is a flow diagram of a process used in one embodiment to define flow types and instances thereof. Processing begins with process block 400, and proceeds to process block 402, wherein one or more flow types are defined. Each flow type typically includes one or more properties. A flow type data structure is updated accordingly. Next, in process block 404, instances based on the defined flow types are defined. A flow type definition is typically retrieved from a flow type data structure, and corresponding attributes are defined, and a programming data structure is updated with the defined instances of the flow types. Next, in process block 406, the associative memory entries corresponding to the defined instances of the defined flow types are generated, and one or more associative memories are accordingly programmed. Processing is complete as indicated by process block 408.

Figure 5:
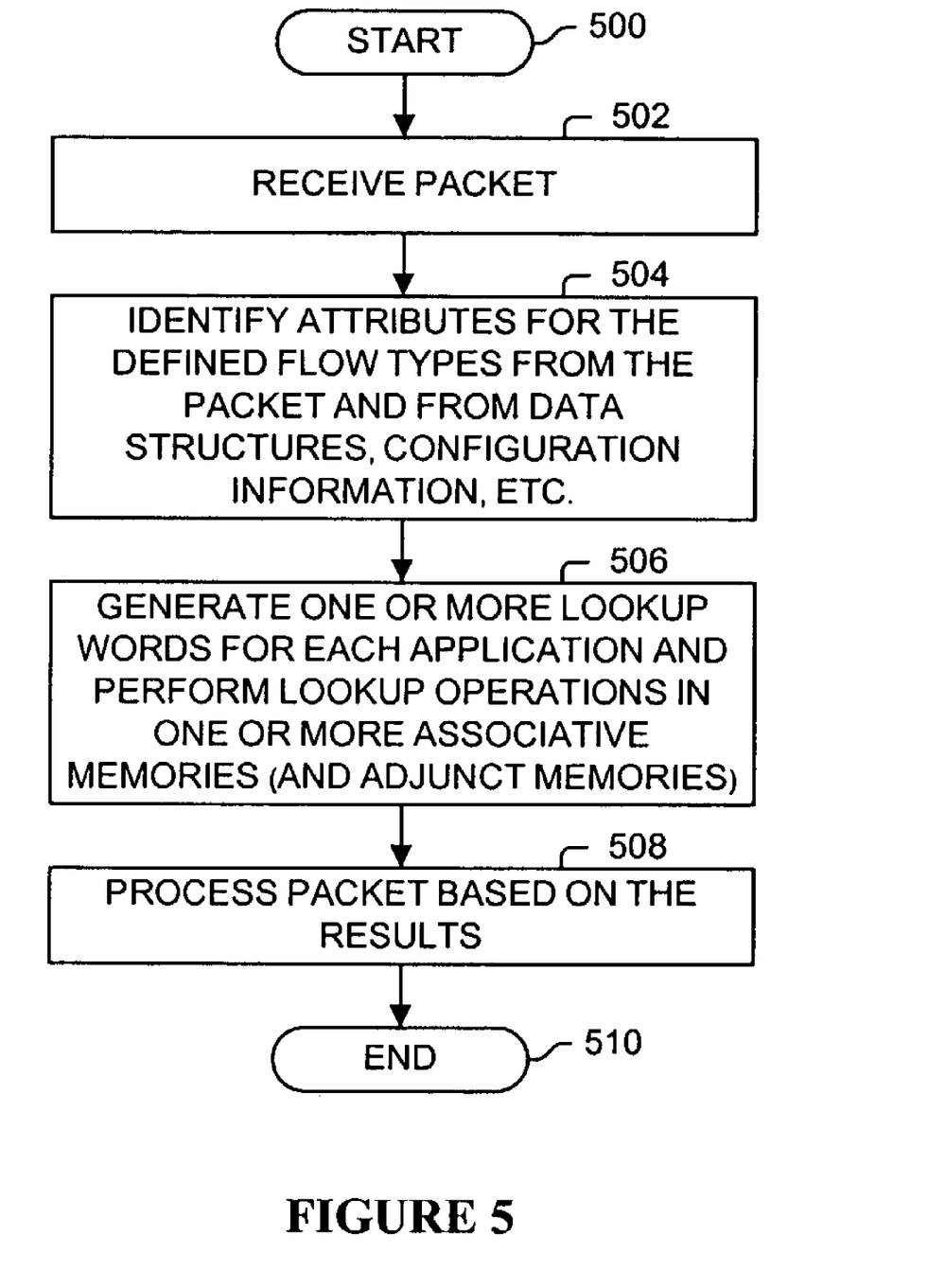
FIG. 5 is a flow diagram of a process used in one embodiment to identify packets corresponding to instances of the flow types.

FIG. 5 is a flow diagram of a process used in one embodiment to identify packets corresponding to instances of the flow types. Processing begins with process block 500, and proceeds to process block 502, wherein a packet is received. Next, in process block 504, attributes corresponding to the received packet for the defined flows are extracted from the packet and/or retrieved from other data structures or identified from configuration information. Next, in process block 506, lookup words are generated for the defined flows for each application, and one or more lookup operations are performed in the associative memories (and optionally in the adjunct memories) to generate the results. Next, in process block 508, the packet is processed according to these results. Processing is complete as indicated by process block 510.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A tangible computer-readable medium embodying computer-executable instructions for performing steps, when executed by one or more processors, for defining and using flow types and instances thereof, said steps comprising:

defining a first flow type including a first set of properties, the first set of properties including at least one property of a plurality of possible properties selectable when defining a flow type, said defining the first flow type including generating an entry in a flow type data structure maintained in a computer storage device for the first flow type, said entry identifiable based on an identifier of the first flow type and said entry including an identification of each property in the first set of properties, with each said property defining a field for containing a corresponding type of value to be matched in an instance of the first flow type;

defining a first instance of the first flow type based on the entry in the flow type data structure corresponding to the first flow type, said defining the first instance including retrieving the first flow type from the computer storage device in order to identify the first set of properties, and associating an attribute in the first instance with each property in the first set of properties;

generating one or more first associative memory entries, based on said defined first instance of the first flow type, including a value for each said attribute in the first instance; and programming one or more associative memories with said generated first associative memory entries; wherein the computer storage device is distinct from said one or more memories.

2. The computer-readable medium of claim 1, wherein said defining the first instance includes identifying attributes for each of the properties of the first set of properties.

3. The computer-readable medium of claim 1, wherein said steps comprise indicating the first flow type to a lookup word generator; wherein the lookup word generator is configured to generate one or more lookup words according to the first flow type in response to said indication of the first flow type.

4. The computer-readable medium of claim 1, wherein said defining the first flow type includes receiving configuration information identifying said at least one property of the plurality of possible properties.

5. The computer-readable medium of claim 1, wherein the configuration information is input via a command line interface.

6. The computer-readable medium of claim 1, wherein said steps further comprise:
   defining a second instance of the first flow type based on the entry in the flow type data structure corresponding to the first flow type, said defining the first instance including retrieving the first flow type from the computer storage device in order to identify the first set of properties, and associating an attribute in the first instance with each property in the first set of properties;
   generating one or more second associative memory entries, based on said defined second instance of the first flow type, including a value for each said attribute in the first instance; and
   programming said one or more associative memories with said generated second associative memory entries.

7. The computer-readable medium of claim 6, wherein the first instance is associated with a first application and the second instance is associated with a second application.

8. The computer-readable medium of claim 1, wherein the first instance is associated with two or more different applications.

9. The computer-readable medium of claim 1, wherein said defining the first instance includes identifying a data structure specification of the first flow type.

10. The computer-readable medium of claim 1, wherein said steps comprise:
    defining a second flow type including a second set of properties, the second set of properties including at least one selected property of the plurality of possible properties selectable when defining a flow type, said defining the second flow type including generating an entry in the flow type data structure for the second flow type, said entry identifiable based on an identifier of the second flow type and said entry including an identification of each property in the second set of properties;
    defining a second instance of the second flow type based on the entry in the flow type data structure corresponding to the second flow type, said defining the second instance including retrieving the second flow type from the computer storage device;
    generating one or more second associative memory entries based on said defined second instance of the second flow type; and
    programming said one or more associative memories with said generated second associative memory entries;
    wherein said second instance includes an instantiated matching value for each of the second set of properties.

11. The computer-readable medium of claim 1, wherein the first set of properties consists of less than all of the plurality of possible properties selectable when defining the flow type.

12. An apparatus for defining and using flow types and instances thereof, the apparatus comprising:
    means for defining a first flow type including a first set of properties, the first set of properties including at least one property of a plurality of possible properties selectable when defining a flow type, said defining the first flow type including generating an entry in a flow type data structure maintained in a computer storage device for the first flow type, said entry identifiable based on an identifier of the first flow type and said entry including an identification of each property in the first set of properties, with each said property defining a field for containing a corresponding type of value to be matched in an instance of the first flow type;
    means for defining a first instance of the first flow type based on the entry in the flow type data structure corresponding to the first flow type, said defining the first instance including retrieving the first flow type from the computer storage device in order to identify the first set of properties, and associating an attribute in the first instance with each property in the first set of properties;
    means for generating one or more first associative memory entries, based on said defined first instance of the first flow type, including a value for each said attribute in the first instance; and
    means for programming one or more associative memories with said generated first associative memory entries; wherein the computer storage device is distinct from said one or more associative memories.

13. The apparatus of claim 12, wherein said means for defining the first instance includes means for identifying attributes for each of the properties of the first set of properties.

14. The apparatus of claim 12, comprising means for generating lookup words corresponding to the first flow type.

15. The apparatus of claim 12, wherein said means for defining the first flow type includes means for receiving configuration information identifying said at least one property of the plurality of possible properties.

16. The apparatus of claim 15, wherein the configuration information is input via a command line interface.

17. The apparatus of claim 12, wherein the first instance is associated with two or more different applications.

18. The apparatus of claim 12, wherein the first set of properties consists of less than all of the plurality of possible properties selectable when defining the flow type.

19. A computer-implemented method for performing steps for defining and using flow types and instances thereof, the method comprising:
    receiving configuration information identifying at least one property of a plurality of possible properties selectable when defining a flow type;
    defining a first flow type including a first set of properties, the first set of properties including said at least one property, said defining the first flow type including generating an entry in a flow type data structure maintained in a computer storage device for the first flow type, said entry identifiable based on an identifier of the first flow type and said entry including an identification of each property in the first set of properties, with each said property defining a field for containing a corresponding type of value to be matched in an instance of the first flow type;

defining a first instance of the first flow type based on the entry in the flow type data structure corresponding to the first flow type, said defining the first instance including retrieving the first flow type from the computer storage device in order to identify the first set of properties, and associating an attribute in the first instance with each property in the first set of properties;

generating one or more first associative memory entries, based on said defined first instance of the first flow type, including a value for each said attribute in the first instance; and programming one or more associative memories with said generated first associative memory entries; wherein the computer storage device is distinct from said one or more associative memories.

20. The method of claim 19, wherein said defining the first instance includes identifying attributes for each of the properties of the first set of properties.

21. The method of claim 19, further comprising indicating the first flow type to a lookup word generator.

22. The method of claim 19, further comprising:
generating one or more lookup words corresponding to the first flow type; and
communicating said one or more lookup words to said one or more associative memories.

23. The method of claim 19, further comprising:
defining a second instance of the first flow type based on the entry in the flow type data structure corresponding to the first flow type, said defining the first instance including retrieving the first flow type from the computer storage device in order to identify the first set of properties, and associating an attribute in the first instance with each property in the first set of properties;
generating one or more second associative memory entries, based on said defined second instance of the first flow type, including a value for each said attribute in the first instance; and
programming said one or more associative memories with said generated second associative memory entries.

24. The method of claim 23, wherein the first instance is associated with a first application and the second instance is associated with a second application.

25. The method of claim 19, wherein the first instance is associated with two or more different applications.

26. The method of claim 19, further comprising:
defining a second flow type including a second set of properties, the second set of properties including at least one selected property of the plurality of possible properties selectable when defining a flow type, said defining the second flow type including generating an entry in the flow type data structure for the second flow type, said entry identifiable based on an identifier of the second flow type and said entry including an identification of each property in the second set of properties;
defining a second instance of the second flow type based on the entry in the flow type data structure corresponding to the second flow type, said defining the second instance including retrieving the second flow type from the computer storage device;
generating one or more second associative memory entries based on said defined second instance of the second flow type; and
programming said one or more associative memories with said generated second associative memory entries;
wherein said second instance includes an instantiated matching value for each of the second set of properties.

27. The method of claim 19, wherein the first set of properties consists of less than all of the plurality of possible properties selectable when defining the flow type.

28. An apparatus comprising one or more processors and memory, wherein the memory stores one or more instructions that, when executed by said one or more processors, perform operations for defining and using flow types and instances thereof, said operations comprising:
defining a first flow type including a first set of properties, the first set of properties including at least one property of a plurality of possible properties selectable when defining a flow type, said defining the first flow type including generating an entry in a flow type data structure maintained in a computer storage device for the first flow type, said entry identifiable based on an identifier of the first flow type and said entry including an identification of each property in the first set of properties, with each said property defining a field for containing a corresponding type of value to be matched in an instance of the first flow type;
defining a first instance of the first flow type based on the entry in the flow type data structure corresponding to the first flow type, said defining the first instance including retrieving the first flow type from the computer storage device in order to identify the first set of properties, and associating an attribute in the first instance with each property in the first set of properties;
generating one or more first associative memory entries, based on said defined first instance of the first flow type, including a value for each said attribute in the first instance; and
programming one or more associative memories with said generated first associative memory entries; wherein the computer storage device is distinct from said one or more associative memories.

29. The apparatus of claim 28, wherein said operations comprise indicating the first flow type to a lookup word generator; wherein the lookup word generator is configured to generate one or more lookup words according to the first flow type in response to said indication of the first flow type.

30. The apparatus of claim 28, wherein said operations comprise:
defining a second flow type including a second set of properties, the second set of properties including at least one selected property of the plurality of possible properties selectable when defining a flow type, said defining the second flow type including generating an entry in the flow type data structure for the second flow type, said entry identifiable based on an identifier of the second flow type and said entry including an identification of each property in the second set of properties;
defining a second instance of the second flow type based on the entry in the flow type data structure corresponding to the second flow type, said defining the second instance including retrieving the second flow type from the computer storage device;
generating one or more second associative memory entries based on said defined second instance of the second flow type; and
programming said one or more associative memories with said generated second associative memory entries;
wherein said second instance includes an instantiated matching value for each of the second set of properties.

31. The apparatus of claim 28, comprising a packet processing engine configured to processes packets based on lookup operations performed on said programmed one or more associative memories.

* * * * *